United States Patent [19]

DeVries et al.

[11] 3,787,612

[45] Jan. 22, 1974

[54] SIGNAL PROCESSING SYSTEM FOR TELEVISION RECEIVER HAVING ACOUSTIC SURFACE WAVE DEVICES FOR IMPROVED TUNING AND VIDEO DEMODULATION

[75] Inventors: Adrian J. DeVries, Elmhurst; Jouke N. Rypkema, Lombard, both of Ill.

[73] Assignee: Zenith Radio Corporation, Chicago, Ill.

[22] Filed: July 3, 1972

[21] Appl. No.: 268,280

[52] U.S. Cl. ............................ 178/5.8 AF, 178/7.3

[51] Int. Cl. ........................................... H04n 5/50

[58] Field of Search.. 178/5.8 R, 5.8 AF, 5.4 R, 7.3; 333/70 S, 72; 329/117, 118, 119, 198; 331/155; 325/489

[56] References Cited

UNITED STATES PATENTS

| | | | |
|---|---|---|---|
| 2,794,910 | 6/1957 | Arends | 325/418 |
| 3,568,102 | 2/1971 | Tseng | 331/155 |
| 3,714,594 | 1/1973 | Adler et al. | 178/5.4 SD |

*Primary Examiner*—Richard Murray

*Attorney, Agent, or Firm*—Nicholas A. Camasto, John H. Coult, & John J. Pederson

[57] ABSTRACT

This disclosure depicts a number of signal processing circuits for a television receiver which include acoustic surface wave devices for improved tuning and video demodulation. In each embodiment an IF stage has an acoustic surface wave bandpass filter. In one embodiment a reference oscillator forming part of a synchronous video detector and also part of an APC loop has a frequency-selective surface wave filter for establishing its frequency of oscillation. Another embodiment has an AFC circuit including a surface wave discriminator. In all embodiments the acoustic surface wave devices have similar thermal characteristics and thermal exposure so as to cause temperature tracking of the frequency characteristics thereof and thereby to temperature stabilize the receiver. The surface wave filter devices which are associated in the disclosed systems may utilize thermally homogeneous piezoelectric substrate means.

11 Claims, 6 Drawing Figures

SIGNAL PROCESSING SYSTEM FOR TELEVISION RECEIVER HAVING ACOUSTIC SURFACE WAVE DEVICES FOR IMPROVED TUNING AND VIDEO DEMODULATION

CROSS-REFERENCE TO RELATED APPLICATION

This application relates to, but is not dependent upon, a copending application of Skerlos, Ser. No. 116,319, filed Feb. 18, 1971, assigned to the assignee of the present application.

BACKGROUND OF THE INVENTION

The present invention is directed to providing improved signal processing circuits for a television receiver, and in particular to providing IF signal processing circuits having improved thermal stability and enhanced integrability.

This invention is especially, but not exclusively, concerned with improving a signal processing circuit of the type described in the referent Skerlos application which includes a synchronous video detector and an APC loop controlled by a common 45.75 MHz reference oscillator. The Skerlos application recognizes a number of limitations and deficiencies in video signal processing systems which utilize envelope detectors and conventional discriminator-type automatic frequency control (AFC) loops. It is noted therein that envelope detection results in undersirable effects as intermodulation between the chroma and sound carriers, quadrature distortion resulting from the use of vestigial single sideband transmission, and inter-carrier buzz in the sound channel. There are also noted in the Skerlos application certain shortcomings of conventional fine-tuning arrangements, including temperature instability.

The described prior art deficiencies are overcome according to the Skerlos invention by the provision of a system which includes an automatic phase control (APC) loop and a single synchronous detector, both controlled by a common reference oscillator.

As set forth in the referent application, the APC loop preferably comprises a phase comparator for comparing the instantaneous frequency and phase of the signal at the output of a selected amplifier in the IF stage and a reference oscillator operating at the desired IF picture carrier frequency (45.75 MHz). Any phase and frequency differences detected within the pull-in range of the system generate an error signal in the output of the phase comparator. The phase comparator is coupled through a low pass filter to a voltage-controlled oscillator (VCO) in the receiver tuner. The output frequency of the oscillator is determined by the DC component of the applied error signal. The frequency of the tuner VCO is thus electronically adjusted until the frequency of the output signal from the tapped IF amplifier precisely matches the output frequency of the reference oscillator.

The reference oscillator is also coupled to a synchronous video detector through a phase shifter which alters the phase by 90° to effect synchronous detection of the video signal. Accordingly, the APC loop provides both automatic fine-tuning within a predetermined pull-in range as well as automatic frequency control so as to maintain the optimum tuning, once established. The APC loop further provides the precise frequency and phase control required for synchronous detection.

In spite of the significant improvements in tuning and demodulation achieved by the described Skerlos invention, there yet exists a need for improved stabilization of the adjacent channel sound trap in the IF stage and minimization of drift and possible misalignment of the reference oscillator in the synchronous detection circuit relative to the traps in the IF stage. A strong general need also exists for receiver circuitry which is fully integratable and thus which does not employ resonant tanks or other circuits requiring inductors. Similar temperature instabilities and need for full integrability exist in video signal processing circuits of other types, particularly those employing AFC and/or APC loops.

OBJECTS OF THE INVENTION

It is a general object of this invention to provide improved signal processing systems for television receivers which meet the above-discussed needs regarding temperature stabilization and full integrability.

It is an object to provide IF signal processing systems, particularly those with automatic phase and/or frequency control, which have improved temperature tracking between IF bandpass filtering characteristics and associated frequency and/or phase control circuits.

It is another general object to provide signal processing systems for television receivers which are improved by the use of acoustic surface wave devices.

It is another object of one aspect of this invention to provide in a television signal processing system a synchronous video detector and an IF signal processing stage utilizing an acoustic surface wave bandpass filter device of relatively simple design, the filtering characteristic of which filter device is temperature locked to the frequency of synchronous detection.

It is yet another object to provide an improved IF signal processing system having an automatic frequency and phase control loop which is stabilized with reference to the bandpass filtering characteristic of an associated IF stage.

It is still another object to provide a synchronous video detection circuit and APC loop which are fully capable of manufacture in integrated circuit form.

It is yet another object to provide a composite acoustic surface wave filter device which is useful in the video signal processing circuitry of a television receiver.

BRIEF DESCRIPTION OF THE DRAWINGS

The features of the present invention which are believed to be novel and unobvious are set forth with particularity in the appended claims. The invention itself, however, together with other objects and advantages thereof, may best be understood by reference to the following description taken in conjunction with the accompanying drawings in which:

DESCRIPTION OF THE PREFERRED EMBODIMENT

Figures 1, 3:
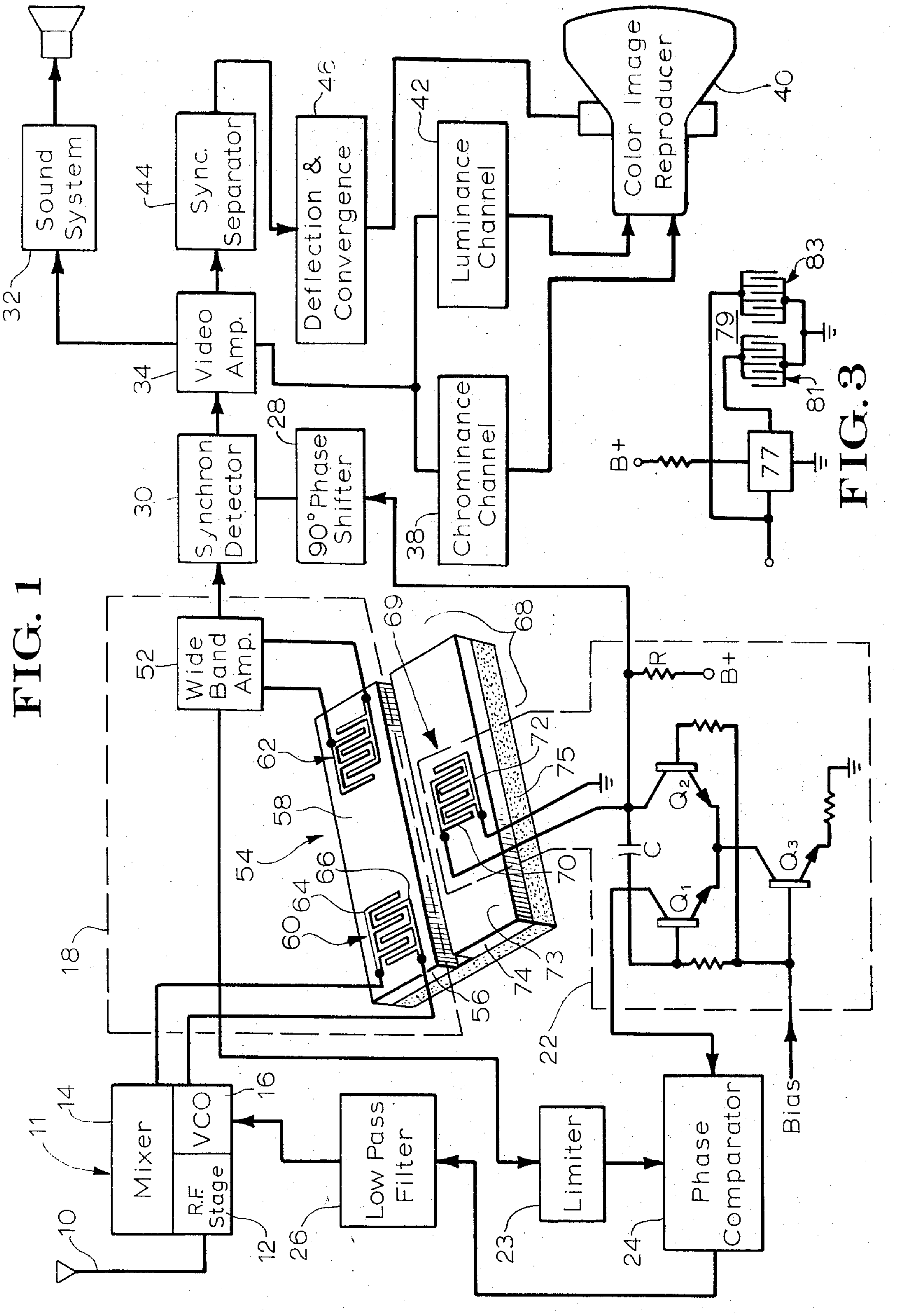
FIG. 1 is a block diagram and schematic illustration of a color television receiver constructed in accordance with the present invention.
FIG. 3 is a schematic diagram of an alternative oscillator which may be employed to carry out the principles of this invention.

Referring now to the drawings, a portion of a color television receiver embodying a preferred implementation of the principles of the invention is illustrated in FIG. 1. The receiver includes an antenna 10 for receiving a televised signal, coupled to a tuner 11. The tuner 11 includes an RF (radio-frequency) stage 12 having one or more amplifiers, a mixer 14 which converts the received signal to an intermediate frequency in the presence of an applied signal from a voltage-controlled local oscillator (VCO) 16. The output of the mixer 14 is applied to an intermediate-frequency (IF) processing stage 18. The IF stage 18 will be discussed in detail below.

Under existing television transmission standards, each television channel occupies a total bandwidth of approximately 6 MHz and the transmitted television signal includes two different RF carriers separated in the frequency spectrum by 4.5 MHz. The lower frequency carrier is vestigial sideband modulated by the luminance (brightness) information and also by a 3.58 MHz subcarrier which has been previously phase and amplitude modulated by the chrominance (color) information. The higher frequency RF carrier is frequency modulated by the audio (sound) information.

The two received RF carriers of the selected television channel are heterodyned with the local oscillator 16 in the tuner 11 to produce an IF signal at the output of the mixer 14 which includes an amplitude-modulated IF picture carrier having modulation components conveying luminance information, a phase and amplitude-modulated color IF carrier having modulation components conveying color information, and a frequency-modulated sound IF carrier having modulation components conveying audio information. The color and sound IF carriers have fixed frequency separations of approximately 3.58 and 4.5 MHz respectively from the IF picture carrier. The precise frequencies of the IF carriers are determined by the operating frequency of the tuner local oscillator.

In accordance with the present industry practice, when the RF tuner is properly tuned to receive a television signal representing a program in color, the local oscillator 16 will be operating at a frequency appropriately higher than both of the received RF carriers to establish the sound IF carrier at 41.25 MHz, the color IF carrier at 42.17 MHz, and the picture IF carrier at 45.75 MHz. See FIG. 2. The modulation sidebands of the color carrier most frequently used for detection of the chroma information cover the frequency range from 41.67 to 42.67 MHz.

However, merely converting the incoming RF signal into an appropriate IF signal will not of itself suffice for optimum image reproduction. In addition to the necessary amplification of the converted signal, the passband or response of the IF stage 18 as a whole must also be shaped such that the various carriers and in turn their modulation components are weighted each to the other in accordance with known principles prior to detection. At optimum operating conditions, the video (picture) carrier at 45.75 MHz is positioned at a point approximately 6 dB down on the higher frequency slope of the response curve which places the color IF carrier at approximately the same level on the lower frequency slope and the sound IF carrier substantially farther down on the lower slope. The adjacent video IF carrier is strongly attenuated. As described in detail below, the associated sound channel IF carrier is attenuated, but by the use of synchronous detection, the attenuation need not be as severe as is necessary when envelope detection is employed.

As previously pointed out, any substantial deviation from the foregoing defined optimum tuning condition for the receiver will result in distortion of one sort or another with attendant degradation in the reproduced color image. Adjusting the tuning of the receiver so that the picture carrier is located substantially in the flat portion of the IF response characteristic will result in undesirable attenuation of the color modulation components since the color carrier will fall farther down on the IF frequency response slope. On the other hand, adjusting the receiver tuning such that the color carrier falls within the flat portion of the IF response is apt to result in objectionable loss of luminance information, excessive color saturation and intermodulation between color and sound modulation components. It is thus apparent that it is desirable to adjust the tuning of the receiver so that the relative positions of the transmitted video, audio, and chroma carriers relative to the IF frequency response characteristic of the IF stage are appropriate. It is desirable to effect such tuning automatically and, once so established, to maintain such optimum tuning over a range of signal variations and operating conditions.

In accordance with general teachings in the referent Skerlos application, the receiver shown in FIG. 1 provides such automatic fine tuning, including an APC loop operating with enhanced performance characteristics in conjunction with a single synchronous detector 30. The APC loop includes tuner 11, IF stage 18, reference oscillator 22 (discussed in detail below), phase comparator 24, limiter 23, and low pass filter 26. The phase comparator 24 receives one input signal from an IF amplifier stage in IF stage 18 and another input signal from the reference oscillator 22. The output of the phase comparator 24 is coupled to the low pass filter 26, the output of the latter being, in turn, coupled to the oscillator 16 of the tuner 11. The reference oscillator 22 is further coupled to the synchronous detector 30 through a phase shifter 28 which effects a 90° phase shift in the applied signal.

The remaining portion of the color television receiver, is of substantially conventional design and, accordingly, a relatively brief reference to the general operating characteristics thereto should suffice. Specifically, the detected composite video signal containing luminance and chrominance information together with similarly detected sound and sync information appears in the output signal of synchronous detector 30. The sound information is coupled to a separate sound system 32 at a suitable take-off point while the composite video signal is suitably amplified in a video amplifier stage 34. Chrominance information in the composite video signal is coupled to a chrominance channel 38 where suitable color-drive signals are developed in a manner known in the art and applied to appropriate electrodes of the receiver's color image reproducer 40.

Luminance information derived from the video amplifier stage 34 is coupled to a luminance channel 42 which develops the brightness level signals for application to still other control electrodes of the image reproducer 40. Additionally, the video amplifier stage 34 is further coupled to a sync separator 44 where suitable synchronizing pulses are derived in a known manner and applied to a deflection and convergence stage 46 containing suitable horizontal and vertical deflection circuits or scanning generators as well as the necessary high voltage supply. Stage 44 may also include provisions for automatic gain control action customarily provided in television receivers, the operation of which is likewise known in the art.

The various output signals from the scanning generators and high voltage supply in stage 46 are likewise applied to the receiver image reproducer which, in conjunction with the derived luminance and chrominance signals, result in a televised image being reproduced on the screen of reproducer 40 having the correct brightness, saturation and hue representations.

In operation, tuner 11 is activated to select a predetermined video channel. For illustrative purposes, it may be assumed that the tuning effected initially deviates to some degree from the precise optimum. For example, the voltage-controlled local oscillator 16 may be assumed to be at a frequency which heterodynes with the received carrier in mixer stage 14 to produce an IF picture carrier at about 46.25 MHz. This, of course, is some 500 kHz higher than the desired frequency of the IF picture carrier of 45.75 MHz. With the reference oscillator 22 fixed tuned to the desired 45.75 MHz frequency, it will be readily understood that the output of the phase comparator 24 will be a beatnote signal at the 500 kHz difference frequency, which if the loop were open would be of an essentially sinusoidal nature, and which beatnote signal is coupled to the input of the low pass filter 26.

The filter 26 has a passband effective to pass the 500 kHz beatnote signal and thus apply the same to the local oscillator 16 of the tuner 11. Accordingly, the local oscillator 16 is frequency modulated by the beatnote signal which when coupled back into the APC loop causes the output of the phase comparator 24 to be the product of a sine wave and a frequency modulated wave.

Since the modulating frequency is equal to the beat frequency, the resultant beatnote signal is now no longer precisely sinusoidal. That is, there is a DC component present and it is this DC component which causes the output frequency of the local oscillator 16 to change in a direction to reduce the detected difference between the heterodyned IF picture carrier and that of the reference oscillator 22 operating at the desired IF picture carrier, or 45.75 MHz. The local oscillator 16 continues to change until the generated IF picture carrier at the output of the IF stage 18 is the same in both frequency and phase and will remain in such condition despite temperature drifts and other variations that would otherwise result in mistuning. This maintenance of frequency match is referred to as "lock-up" while the change in local oscillator frequency to reach such condition is customarily referred to as the "pull-in" range of the APC loop.

Once lock-up is achieved for the loop, the respective input signals to the synchronous detector 30 are in proper phase relation to provide synchronous detection of the various modulation components conveying the synchronization, sound, luminance and chrominance information. The proper in-phase relationship between respective input signals to detector 30 is effected by virtue of IF picture carrier being locked to the output signal of the reference oscillator 22, operating at the desired 45.75 MHZ picture carrier frequency, with the oscillator 22 itself forming the other input to detector 30. The signal inputs to detector 30 are thereafter maintained in the required in-phase relationship by the action of the APC loop, as previously described.

It is noted in the referent Skerlos application that synchronous detection *per se* is known in the art. Synchronous detection has been utilized in the color demodulation circuitry of the color receiver. However, synchronous detection was not utilized before the Skerlos invention in the detection of modulation components of the converted IF carrier signal because of the significantly higher costs involved as well as the additional complexity in providing the proper phase and frequency control of the input signal information to such detectors. In the system of the Skerlos application and in the improved system of this invention, both drawbacks are effectively circumvented. A single synchronous detector replaces the several envelope detectors of the prior receivers along with the required sound trap to effect adequate suppression of the 920 kHz beatnote.

The synchronous detection is automatically keyed to the action of the associated APC loop so that the required frequency and phase relationships between the signal information as applied to the single detector 30 are correctly maintained at all times. No other control circuitry is required. It is also significant that the APC loop, in addition to providing automatic fine tuning, also exhibits a lock-in or holding action which eliminates the need for automatic frequency control (AFC) in conventional receivers and thus reduces manufacturing costs even further.

The improvements to the system of the referent Skerlos application which characterize this invention will now be described in detail.

It is well known in the patent literature to use an acoustic surface wave bandpass filter in the IF stage of a television receiver to perform processing functions such as shaping the filter characteristic of the IF stage. By the use of surface wave filter devices, rather than filtering circuits using frequency-sensitive electrical components such as conventional capacitors and inductors, an IF stage can be fabricated by purely integrated circuit techniques. The construction, uses and advantageous characteristics of acoustic surface wave bandpass filter devices for use in the IF stage of a television receiver can be derived from a study of prior art patents such as U.S. Pats. Nos. 3,550,045; 3,582,540; 3,582,838; 3,581,248: 3,582,840; 3,600,710; 3,573,673; 3,626,309; 3,559,115: and 3,596,211, all assigned to the assignee of the present invention.

However, when used with conventional envelope-type video detectors, which require the provision of a deep trap for removing the associated sound IF carrier, it is necessary to use a number of surface wave filter devices or devices of undesired complexity in order to accomplish the necessary high attenuation of the associated sound carrier signal. By way of illustration, the above-mentioned U.S. Pat. No. 3,582,838 teaches the use of a plurality of surface wave filter devices in cascade to achieve the desired IF frequency response characteristic. U.S. Pat. No. 3,550,045 suggests the use of a composite, somewhat complex filter device having a plurality of input and/or output transducers.

In accordance with one aspect of this invention there is provided a television signal processing circuit including a surface wave IF bandpass filter device of simple design cooperating with a synchronous video detector, a combination which is capable of achieving video demodulation and suitable IF filtering in such a way as to exploit the beneficial aspects of the combination without suffering the need for filter devices of undesired complexity and manufacturing expense. This combination of cooperative signal processing elements exploits a recognition that by the use of a synchronous detector for video demodulation, a deep associated sound trap is unnecessary. It has been found that a simple, single stage surface wave IF bandpass filter is adequate to perform the necessary IF filtering when used in association with a detector of the synchronous type.

In the preferred embodiment illustrated in FIG. 1, IF stage 18 is shown as comprising an acoustic surface wave IF bandpass filter device 54 and a wideband amplifier 52. The filter device 54 may take any of a number of forms known in the prior art (see, for example referent U.S. Pat. Nos. 3,582,838 and 3,550,045). However, to the ends of minimized cost and simplified construction, the device 54 is of relatively simple construction, as shown, comprising a surface wave propagative substrate 56 having a smooth surface 58 on which is disposed a pair of electro-acoustic transducers 60, 62, each comprising an array of comb-like interdigital electrodes.

Transducer 60, which may be considered to be the input transducer, launches acoustic surface waves having a center frequency and bandwidth determined by the design of the interdigital electrodes 64, 66. The acoustic waves launched by the input transducer 60 propagate across the surface 58 and are received by the (output) transducer 62 for transduction into an electrical signal suitable for delivery to the wideband amplifier 52.

Although a wide variety of constructions and arrangements can be employed to achieve the desired IF bandpass filtering function, the device 54 may, for example, be constructed having as the substrate 56 a Y-cut lithium niobate crystal, the Y face of the crystal being in the plane of surface wave propagation and the Z axis of the crystal being in the direction of surface wave propagation. The transducers may take the form of deposited electrically conductive metallic lines which may be for the IF application under discussion, approximately 0.0007 inch in width and separated by the same dimension. As mentioned above, further details of construction and operation of surface wave filter devices and alternative materials and configurations can be obtained from the prior art.

Figures 2A, 2B, 2C, 4:
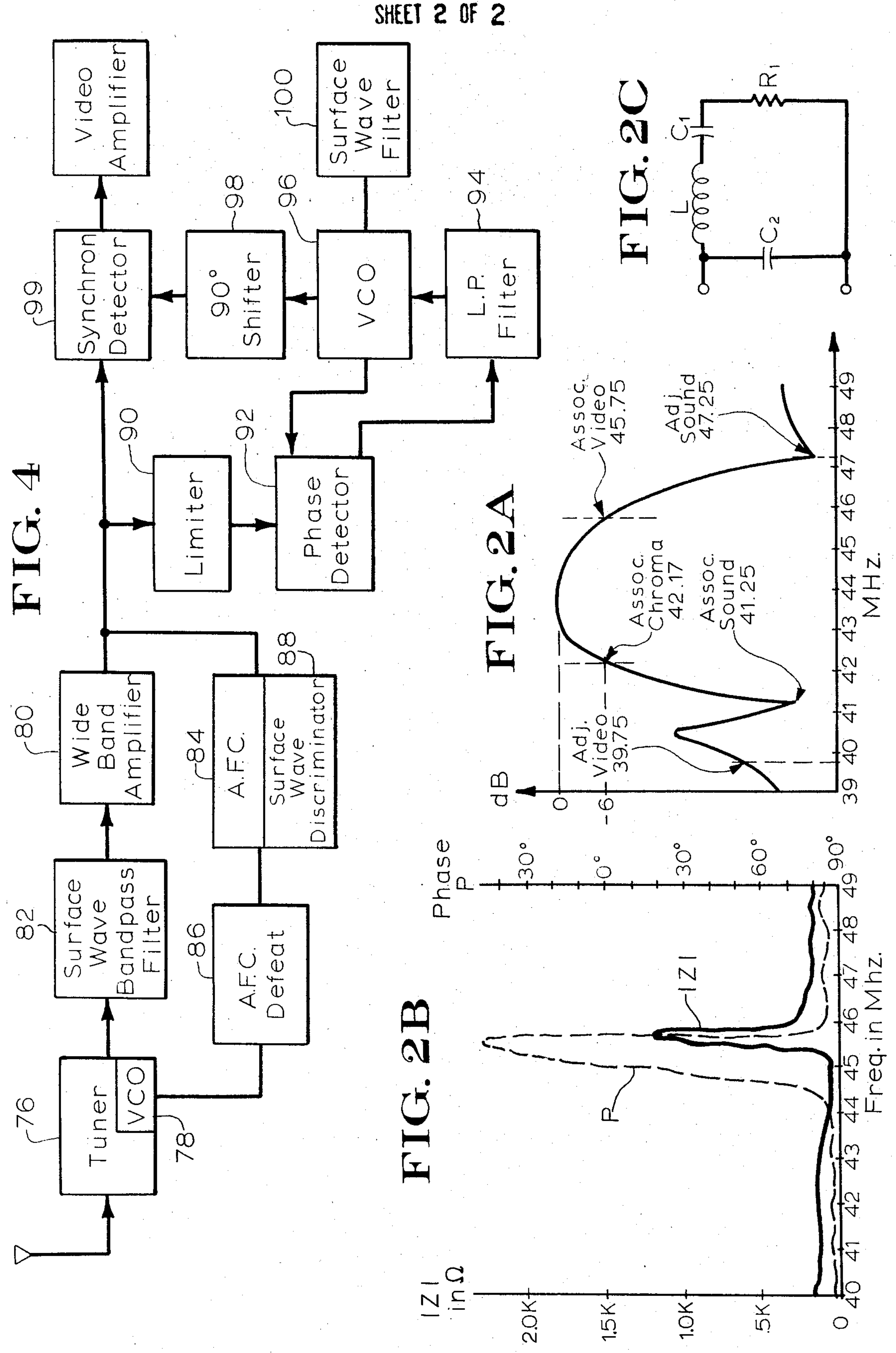
FIG. 2A is a graphic illustration of the frequency response characteristic of the intermediate frequency (IF) channel of a television receiver which is useful in understanding the present invention.
FIG. 2B is a graph showing impedance and phase characteristics as a function of frequency of a frequency selective surface wave filter constituting part of the FIG. 1 system.
FIG. 2C is an equivalent circuit representation of a surface wave filter device comprising part of the FIG. 1 system.
FIG. 4 is a schematic illustration of an alternative embodiment of the illustration.

The curve in FIG. 2A depicts an IF bandpass response characteristic which may be produced by surface wave filter device 54. It is noted that the associated channel sound trap is relatively shallow; however, for reasons set forth above, the use of synchronous video detection obviates deep associated sound trapping.

The system of the referent Skerlos application employs a synchronous detector including a reference oscillator which serves also as a frequency standard in an APC loop. The described reference oscillator is of conventional construction employing as the frequency-determining element a common LC tank. As is well known, conventional inductors and, to a lesser effect, capacitors, are not readily integratable.

In accordance with another aspect of this invention, a reference oscillator having the same general functions as the reference oscillator in the Skerlos system includes as its frequency-determining element a surface wave filter having a driving point impedance or transfer characteristic which is highly selective of a predetermined frequency for establishing the frequency of oscillation of the reference oscillator. By this expedient, a system is provided which has a synchronous detector and APC loop fully capable of integrated circuit manufacture.

The reference oscillator 22 is illustrated as being formed by a pair of transistors $Q_1$ and $Q_2$ connected in differential amplifier configuration, with an additional transistor $Q_3$ serving as a constant current source. The required feedback for oscillator 22 is effected from the collector of $Q_2$ through capacitor C to the base of transistor $Q_1$.

Reference oscillator 22 includes as its frequency-determining element a highly frequency selective surface wave device 68 connected across the output of transistor $Q_2$ in parallel with a large DC by-pass resistor R. The use of a surface wave device as a high-Q frequency selective filter is taught in general terms in a U.S. Pat. No. 3,582,837 to DeVries, a co-inventor of the subject invention. The device 68 is illustrated as including a transducer 69 comprising a pair of interdigital comb-like electrodes 70, 72 which may be of well-known construction, as described in the above-mentioned and other prior art patents and publications.

In the illustrated preferred embodiment, the surface wave device 68 is illustrated as being connected as a two-terminal device and in such a way as to take advantage of its parallel resonance characteristics. By way of background, in order to promote a fuller understanding of the scope of the invention, reference may be had to FIG. 2C which depicts a surface wave device in its approximate equivalent circuit form.

As shown, the equivalent circuit of the device 68 includes an inductance L, a capacitance $C_1$ and a resistance $R_1$ in series, this series combination being in parallel with a capacitance $C_2$. The capacitance $C_2$ may include extrinsic stray capacitance as well as intrinsic capacitance in the filter 68. As shown by curve Z in FIG. 2B, the filter has a series resonant frequency, depicted as occurring at approximately 44.75 MHz, representing the resonant frequency of the series combination of the inductance L and capacitance $C_1$. The filter exhibits parallel resonance at a frequency above the series resonant frequency, portrayed in FIG. 2B as being at approximately 45.75 MHz. It can be seen from FIG. 2B that the parallel resonance characteristic of the device 68 is extremely high Q and offers a high degree of selectivity of the 45.75 MHz frequency.

It should be understood that it is within the purview of this invention to utilize a surface wave filter device in a two-terminal, parallel resonance configuration, as depicted in the FIG. 1 system, or in a two-terminal, series resonance configuration, or as a four-terminal device (described below) having a highly frequency selective transfer characteristic.

For example, to employ the surface wave device 68 in a series resonance mode, the FIG. 1 oscillator circuit could be modified by removing the device 68 from its parallel connection and placing it in the feedback circuit in order that a maximum amount of feedback occurs at the frequency of series resonance. It should be understood, of course, that in a reference oscillator application wherein the device 68 is employed in a series resonance mode, its design would have to be such as to place the series resonant point at 45.75 MHz, rather than at a lower frequency, as shown.

It is very important to note the role played by the phase of the feedback signal in determining the frequency of resonance. It is the in-phase component of the feedback signal that is regenerated in the amplifier. Thus the phase of the feedback signal can play a large part in determining the resonant frequency. As can be seen in FIG. 2B, the phase of the feedback signal (see curve P) is 0° relative to the input signal at the points of series and parallel resonance. It should be noted that the slope of the phase curve P is extremely steep in the region of parallel resonance. This is a highly desirable characteristic for the reason that variations in the phase of the feedback signal when the filter is connected in its parallel resonance mode) will cause little deviation from the desired 45.75 MHz frequency of resonance.

It should also be noted in the series resonant mode the impedance does not vary strongly as a function of frequency. Therefore the frequency of the oscillator in this mode is primarily determined by the phase characteristic.

Although it is preferred in applications such as the FIG. 1 system to connect the device 68 in a two-terminal parallel resonance configuration, there may be applications wherein external capacitance may be difficult to control or compensate which would make it desirable to use the filter in its series resonance configuration. As noted above, the series resonant frequency of the filter is not dependent on external capacitance.

Curve Z in FIG. 2B depicts the impedance-versus-frequency characteristic of a surface wave device 68 which was actually constructed and tested. Curve P in FIG. 2B portrays the phase-versus-frequency characteristic of that device. In the illustrated embodiment wherein the frequency to be selected is 45.75 MHz, the lines of electrodes 70, 72 are in the order of 0.0007 inch wide and may be separated by 0.0007 inch. The electrode lines may, for example, be in the order of 50–100 in number and 0.1 to 0.5 inch wide (transverse to the direction of acoustic wave propagation). The selectivity of the device 68 may be predetermined by appropriate selection of the number of electrode lines which are provided. Other characteristics of the device 68 may also be selected by appropriate design of the transducer electrodes and substrate, as is well known in the prior art.

As briefly discussed above, in spite of the described advantages accruing to the system set forth in the referent Skerlos application, a possible deficiency exists nevertheless in the susceptibility of the synchronous detector in that system (employing an LC tank for frequency determination) to drift with temperature relative to the bandpass filtering characteristic of the IF stage 18. For lithium niobate, the temperature coefficient of the surface wave velocity is in the order of 80 parts per million per degree centigrade. Since the frequency characteristic of a surface wave device is a function of the surface wave velocity, it is evident that a change in the temperature of the surface wave propagative medium will cause a shift in the frequency response characteristic of the device.

In accordance with yet another aspect of this invention, as shown in FIG. 1, the surface wave bandpass filter device 54 and the frequency selective device 68 comprising part of the reference oscillator 22 are combined to form a composite acoustic surface wave device employing a piezoelectric substrate or plural substrates having similar thermal response characteristics and similar thermal exposure. By this expedient, the synchronous detector and APC loop, both controlled by the reference oscillator 22, are temperature locked to the IF bandpass filter characteristic of the IF stage 18. Thus, in the event that, for example, a temperature excursion should cause a drifting of the frequency of reference oscillator 22, and thus the frequency at which video information is demodulated, the bandpass filter characteristic of the IF stage 18 will experience a similar shift, with the result that the IF bandpass filter characteristic and the frequency of synchronous video detection will track each other.

Referring to the FIG. 1 illustration, in a preferred embodiment, the electrodes 70, 72 of the transducer 69 are deposited upon the surface 73 of a piezoelectric substrate 74 separated from but thermally coupled to the substrate 56 on which the transducers 60, 62 of the IF bandpass filter device 54 are deposited. The substrates 56 and 74 are shown as a single package being supported on a common acoustically absorptive base 75. In applications wherein mechanical isolation is not considered to be a paramount consideration, it may be preferred to place transducers 60, 62 of the filter device 54 and the transducer 69 of device 68 on a common surface of the same piezoelectric substrate. Yet another alternative is to place the transducers of device 54 and device 68 on different surfaces of the same piezoelectric medium.

It should be noted at this point that the illustration of the composite surface wave filter device is purely schematic, and does not, in the interest of clear presentation of the present invention, portray structure in accurate scale or include such desirable ancillary structures as means for suppressing surface wave reflections.

As suggested above, it is within the compass of this invention to substitute in the FIG. 1 system for the reference oscillator 22 an oscillator which has a four-terminal surface wave frequency-determining filter. FIG. 3 depicts such an oscillator, comprising an amplifier 77 similar in structure and function to the amplifier described above as constituting part of the reference oscillator 22 but without a feedback capacitor. The FIG. 3 oscillator includes a four-terminal acoustic surface wave filter 79 having a highly frequency selective transfer characteristic. The surface wave filter 79 is shown as including a transmitting transducer 81 and a receiving transducer 83, both illustrated in highly schematic form. The transducers 81, 83 may be deposited on a piezoelectric substrate such as shown at 74 in the FIG. 1 system.

The transmitting transducer 81 has its input terminals connected across the output of amplifier 77 corresponding to the collector of transistor $Q_2$ in the FIG. 1 system. The receiving transducer 83 has one of its output terminals connected to ground and the other connected through a feedback lead to the input of amplifier 77 corresponding to the base of transistor $Q_1$ in the FIG. 1 system.

As is well known, the frequency response characteristic of a surface wave filter device such as shown at 79 can be predetermined by appropriate selection of the configuration and properties of the transducers 81, 83 and the wave propagating medium interconnecting the transducers.

It may be useful to note at this point that the phase characteristics of the surface wave filter 79 play an important part in the operation of the FIG. 3 oscillator. First, it is important that the phase shift corresponding to the time of propagation of the surface waves between the transmitting and receiving transducers 81, 83 be such that when added to the phase shift introduced by the amplifier 77, produces at the frequency of maximum response of the surface wave device a total phase shift equal to an integral multiple of $2\pi$. By way of example, assuming that the amplifier 77 introduces a 180° phase shift between its input and output, then the phase shift introduced by the surface wave filter 79 should be 180°, or an odd multiple of 180°.

Secondly, it is important that the propagation time for surface waves to travel between the transmitting and receiving transducers 81, 83 be maintained as small as possible in order to minimize the possibility of parasitic oscillations. Increasing the separation of the transducers 81, 83 results in increasing phase shifts for a given range of frequencies, introducing the possibility that if the phase gradient is sufficiently great parasitic oscillation at frequencies other than the center frequency of the transducers may occur. In a preferred embodiment, the spacings between the transmitting and receiving transducers 81, 83 are maintained as small as possible consistent with the afore-stated objective of maintaining regenerative feedback to the input of the amplifier 77. Assuming 180° phase shift in the amplifier 77, the preferred spacing between the transducers 81, 83 is the minimum spacing at which the phase shift between the electrical output and input signals of the surface wave filter is 180°.

FIG. 1 illustrates the principles of this invention in a system having a synchronous detector and an APC loop which are both controlled by a common reference oscillator. Surface wave filter devices in the IF stage 18 and in the reference oscillator 22 are thermally coupled or otherwise caused to experience similar thermal variations such that the APC loop and synchronous detector temperature track the frequency characteristic of the IF stage 18. The principles of this invention; however, are intended to be broad and to encompass the use of acoustic surface wave devices in demodulating circuits, and in frequency and/or phase control circuits, of diverse constructions and types.

FIG. 4 schematically illustrates an alternative embodiment of the invention in which surface wave devices are incorporated in an APC loop, in a separate and distinct AFC loop, and in a surface wave bandpass filter in an associated IF stage, all of which surface wave devices are temperature interlocked.

In more detail, the FIG. 4 system includes a tuner 76 having a VCO (voltage-controlled oscillator) 78 coupled to a wideband amplifier 80 through a surface wave IF bandpass filter 82. The FIG. 4 system has an AFC loop including an AFC circuit 84 which can be manually overridden by an AFC defeat 86. The surface wave bandpass filter 82 may be of a construction as described in the above-mentioned U.S. Pat. Nos. 3,582,838 or 3,550,045.

In order that the AFC circuit may be caused to temperature track the filtering characteristic of the filter 82, in accordance with the principles of this invention, the AFC circuit 84 preferably includes a surface wave discriminator device 88 for generating a control signal which is fed back to the VCO 78 in the tuner 76 to effect automatic frequency alignment between the IF video carrier frequency and a reference center frequency established by the discriminator 88. The surface wave discriminator 88 may be of a construction as described in U.S. Pat. No. 3,582,540, issued to Adler and DeVries, the latter being a co-inventor of this invention.

The FIG. 4 system also has a separate APC loop including a limiter 90, a phase detector 92, a low-pass filter 94, a voltage-controlled local oscillator 96, a 90° phase shifter 98, and synchronous detector 99. The local oscillator 96 preferably incorporates as its frequency-establishing element an acoustic surface wave filter 100. In order to provide for control of the frequency of oscillation of the local oscillator 96, a voltage-variable impedance in the oscillator 96, for example a varactor, may be coupled across the surface wave filter 100 so as to alter the frequency parallel resonance thereof.

In accordance with the principles of this invention, the surface wave filter 100 is preferably caused to have similar thermal response characteristics and similar thermal exposure as the surface wave bandpass IF filter 82 and as the discriminator in the AFC circuit 84 so as to assure temperature tracking of the filter 100 with the AFC circuit 84 and the IF filter 82.

It is manifest the principles of this invention are also applicable to systems having either an AFC circuit or an APC loop, but not both. The invention is applicable to television receiver systems in general wherein it is desirable to have a video demodulating circuit and frequency and/or phase control circuit thermally locked to the IF frequency filtering characteristics of the system.

The invention is not limited to the particular details of construction of the embodiments depicted and other modifications and applications are contemplated. Certain changes may be made in the above described apparatus without departing from the true spirit and scope of the invention herein involved and it is intended that the subject matter in the above depiction shall be interpreted as illustrative and not in a limiting sense.

We claim:

1. In a television reader, a system comprising:

tuner means for selecting a desired RF video channel and for converting a selected RF video carrier to a carrier at a predetermined IF video carrier frequency;

an IF stage coupled to said tuner means including an acoustic surface wave IF bandpass filter for shaping the frequency response characteristic of the IF stage;

video demodulating means for demodulating said IF video carrier to produce a video signal; and control means, including means establishing a reference frequency,-being responsive to an IF signal from said IF stage for causing said system to automatically seek a frequency alignment between said IF video carrier frequency and said reference frequency, said system being characterized by having a frequency sensitive acoustic surface wave device in at least one of said demodulating means and said control means, said acoustic surface wave IF bandpass filter and said surface wave devices having similar thermal response characteristics and similar ambient thermal exposure so as to cause temperature tracking of the frequency characteristics of said IF stage and of said device.

2. The system defined by claim 1 which includes in said tuner means a voltage-controlled local oscillator, and wherein said control means includes an AFC loop which includes said tuner means and which has an acoustic surface wave discriminator constituting said surface wave device having a center frequency constituting said reference frequency, said discriminator generating a control signal for adjusting the tuning of said voltage-controlled local oscillator to effect said frequency alignment.

3. The system defined by claim 1 wherein said video demodulating means comprise a synchronous detector, and wherein said system includes reference oscillator means for establishing a reference demodulation frequency for said synchronous detector, said reference oscillator means including a frequency selective surface wave device constituting said surface wave device for establishing the frequency of oscillation of said oscillator.

4. The system defined by claim 3 which includes in said tuner means a voltage-controlled local oscillator, and wherein said control means includes an AFC loop which includes said tuner means and which has an acoustic surface wave discriminator constituting said surface wave device having a center frequency establishing said reference frequency, said discriminator generating a control signal for adjusting the tuning of said voltage-controlled local oscillator to effect said frequency alignment.

5. In a television receiver, a system comprising:

tuner means for selecting a desired RF video channel and for converting a selected RF video carrier to a video carrier at a predetermined IF video carrier frequency, said tuner means including a voltage-controlled local oscillator;

an IF stage coupled to said tuner means including an acoustic surface wave IF bandpass filter for shaping the frequency response characteristic of the IF stage, said acoustic surface wave If bandpass filter having a first thermal response characteristic;

video demodulating means for demodulating an IF signal from said IF stage to produce a video signal; and control means responsive to an IF signal from said IF stage and comprising an AFC loop including said tuner means, said control means including an acoustic surface wave discriminator having a center frequency, said discriminator generating a control signal for adjusting the tuning of said voltage-controlled local oscillator to cause said system to automatically seek a frequency alignment between said IF video carrier frequency and said center frequency, said acoustic surface wave discriminator having a second thermal response characteristic, the thermal response characteristics of said bandpass filter and said discriminator being similar; and means exposing said bandpass filter and said discriminator to similar ambient temperatures to cause temperature tracking of the frequency characteristics of said IF stage and of said AFC loop.

6. In a television receiver, the combination comprising:

tuner means for selecting a desired RF video channel and for converting a selected RF video carrier to a carrier at a predetermined IF video carrier frequency;

an IF stage coupled to said tuner means; and means including a synchronous detector for demodulating said IF video carrier, and a reference oscillator for generating a reference signal precisely at said predetermined IF video carrier frequency for heterodyning with said IF video carrier from said IF stage, said reference oscillator being characterized by a piezoelectric substrate having a smooth surface upon which is a single surface wave filter transducer with a pair of interdigitated electrodes having an impedance characteristic which is highly frequency selective at said IF video carrier frequency for establishing the frequency of oscillation of said oscillator.

7. In a television receiver, the combination comprising:

tuner means for selecting a desired video channel and for converting a selected RF video carrier to a carrier at a predetermined IF video carrier frequency, said tuner means including a local oscillator controllable in frequency by means of a voltage control signal;

an IF stage coupled to said tuner means;

a synchronous detector for demodulating said IF video carrier, including a reference oscillator for generating a reference signal precisely at said predetermined IF video carrier frequency for heterodyning with said IF video carrier from said IF stage; and an automatic frequency and phase control loop including comparator means receiving an IF video carrier signal from said IF stage and a signal from said reference oscillator for generating a control signal representing any difference in frequency or phase between the compared signals, said loop including means for coupling said control signal back to said local oscillator in said tuner means so as to adjust the frequency and phase of said IF video carrier frequency toward synchronism with said reference oscillator at a predetermined phase displacement, said reference oscillator being characterized by a piezoelectric substrate having a smooth surface upon which is a single acoustic surface wave filter transducer with a pair of interdigitated electrodes having an impedance characteristic which is highly frequency selective at said IF video carrier frequency for establishing the frequency of oscillation of said reference oscillator.

8. In a television receiver, the combination comprising:

tuner means for selecting a desired video channel and for converting a selected RF video carrier to a carrier at a predetermined IF video carrier frequency, said tuner means including a voltage-controllable local oscillator;

an IF stage coupled to said tuner means, including an acoustic surface wave bandpass filter comprising an appropriately poled, thermally homogeneous piezoelectric substrate means on which is disposed in spaced relationship input surface wave transducer means and output surface wave transducer means;

a synchronous detector for demodulating said IF video carrier including a reference oscillator for generating a reference signal precisely at said predetermined IF video carrier frequency for heterodyning with said IF video carrier from said IF stage; and an automatic frequency and phase control loop including a comparator for receiving an IF video carrier signal from said IF stage and a signal from said reference oscillator for generating a control signal representing any difference in frequency or phase between the compared signals, said loop including means for coupling said control signal back to said local oscillator in said tuner means so as to adjust the frequency and phase of said IF video carrier frequency toward synchronism with said reference oscillator at a predetermined phase displacement, said reference oscillator being characterized by including frequency selective acoustic surface wave filter means having a driving point impedance characteristic which is highly frequency selective at said IF video carrier frequency for establishing the frequency of oscillation of said oscillator, said filter means including third surface wave transducer means disposed on said piezoelectric substrate means.

9. The apparatus defined by claim 8 wherein said input, output and third transducer means are disposed upon a common surface of said substrate means.

10. For use in a video signal processing system of a television receiver having an IF signal processing stage and a synchronous video detection circuit having a reference oscillator, a composite surface wave filter device comprising:

thermally homogeneous piezoelectric substrate means propagative of acoustic surface waves;

input and output surface wave transducer means adapted for connection in said IF signal processing stage and disposed in spaced relationship on a surface of said substrate means for respectively launching and receiving surface waves on said substrate surface, said input and output transducer means being configured such as to impress upon an electrical output signal developed by said output transducer means a predetermined IF bandpass filtering characteristic; and third electro-acoustic transducer means on a surface of said substrate means and adapted for connection in said reference oscillator in said synchronous video detection circuit so as to establish the frequency of oscillation thereof, said third transducer means being configured and arranged such that the impedance characteristic thereof if highly frequency selective at a predetermined IF video carrier frequency.

11. The apparatus defined by claim 10 wherein said input, output and third transducer means are located on separate, thermally coupled piezoelectric substrates.

* * * * *

UNITED STATES PATENT OFFICE
CERTIFICATE OF CORRECTION

Patent No. 3,787,612 Dated January 22, 1974

Inventor(s) Adrian J. DeVries and Jouke N. Rypkema

It is certified that error appears in the above-identified patent and that said Letters Patent are hereby corrected as shown below:

column 12, line 55, delete "reader" and substitute --receiver--.

column 16, line 28, delete "if" and substitute --is--.

Signed and sealed this 3rd day of December 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
★ U.S. GOVERNMENT PRINTING OFFICE : 1969 O—366-334.